July 1, 1947.  L. DEVAUX  2,423,086
SYNCHRONIZING DEVICE
Filed March 1, 1943  3 Sheets-Sheet 2
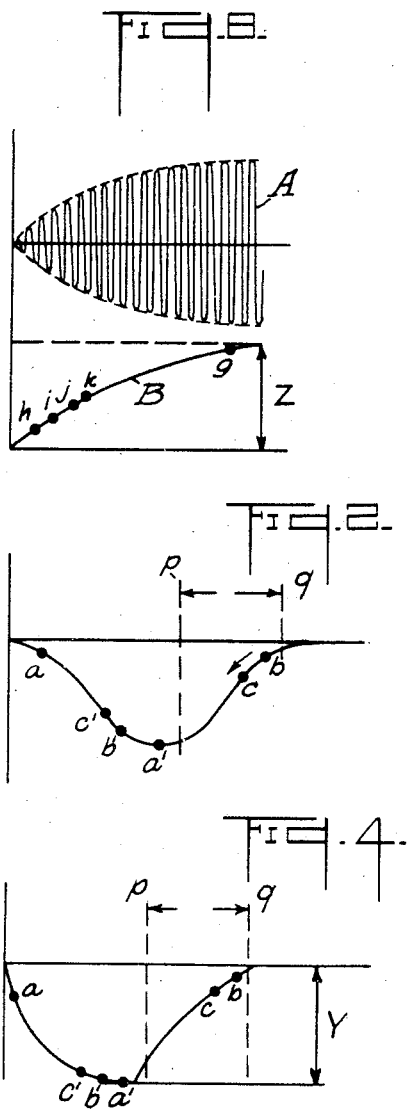
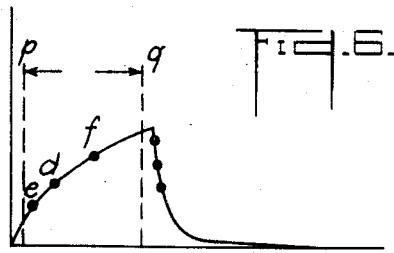
INVENTOR
LUCIEN DEVAUX
BY
ATTORNEY July 1, 1947.   L. DEVAUX   2,423,086
SYNCHRONIZING DEVICE
Filed March 1, 1943   3 Sheets—Sheet 3
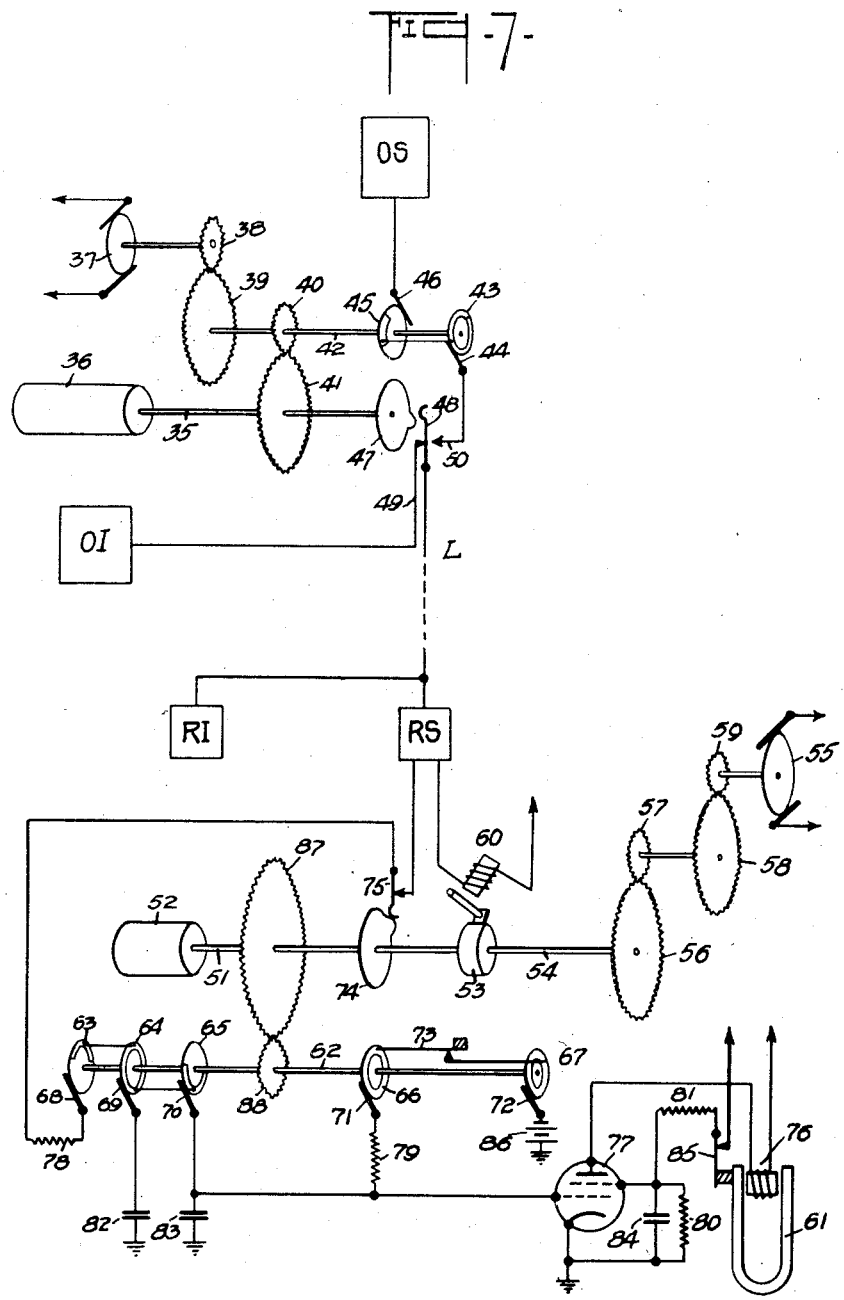
INVENTOR
LUCIEN DEVAUX
BY
Edward... 
ATTORNEY Patented July 1, 1947

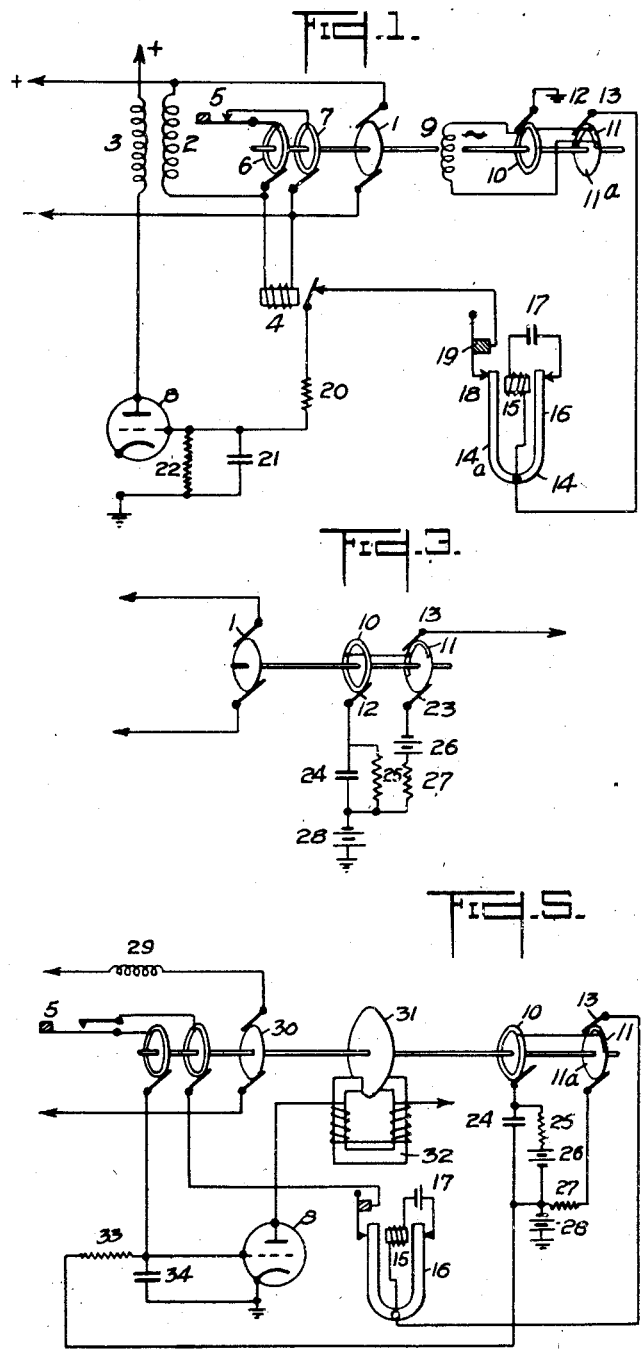

2,423,086

UNITED STATES PATENT OFFICE 2,423,086

SYNCHRONIZING DEVICE

Lucien Devaux, Lyon, France, assignor to International Standard Electric Corporation, New York, N. Y., a corporation of Delaware Application March 1, 1943, Serial No. 477,649
In France April 11, 1942

3 Claims. (Cl. 172—293)

1

The present invention relates to a control and synchronizing device for rotary shafts. More particularly, the invention relates to a device of this type which can be used in all installations where an accurate regulation of the rotary speed of one shaft or the synchronous rotation of two separated shafts is required, such as for instance in telegraph systems in which the shafts of the transmitter and of the receiver are required to turn at exactly the same speed and to assume exactly predetermined relative angular positions or phases.

An object of the invention is to combine with a first rotary system means to control from said first system a remote speed control device of a second rotary system so as to give to the latter a speed of rotation exactly equal to that of the former.

A further object of the invention is to provide means for an exact isochronism or phase equalization of two rotary systems.

Still another object of the invention is to provide control means for an electro-motor whereby the motor is made to operate at a predetermined and constant speed of rotation.

These and other objects are accomplished according to the invention by the combination and arrangement of elements set forth in the following detailed description, defined in the appended claims and diagrammatically illustrated in the accompanying drawings, in which Fig. 1 is a wiring diagram of a control system, according to the invention, for a direct current motor;

Fig. 2 is a diagram illustrating the operation of the system according to Fig. 1;

Fig. 3 is a wiring diagram of a part of a system similar to that of Fig. 1, showing a modification;

Fig. 4 is a diagram illustrating the characteristics of the modified system according to Fig. 3;

Fig. 5 is a wiring diagram of a control system according to the invention, for a universal motor;

Fig. 6 is a diagram illustrating the operation characteristics of the system according to Fig. 5;

Fig. 7 is a wiring diagram of a control system for two motors disposed at two remote stations, respectively; and Fig. 8 is a diagram illustrating the functional characteristics of the system according to Fig. 7.

Referring now to the drawings, and particularly to Fig. 1, 1 denotes the armature of the motor the speed of which is to be controlled, and 2 and 3 are the two field windings of said motor.

2

The shunt field winding 2 is connected in series with a relay 4 which has a certain resistance. The relay 4 is shunted by a contact 5 which is operated by means of a centrifugal device mounted on the motor shaft. The contact 5 is connected with the relay 4 through two collectors 6 and 7 provided with brushes.

The second field winding 3 of the motor is inserted in the plate circuit of a triode amplifier tube 8. The direction of the windings 2 and 3 is such that their effects are added to create the armature field.

An auxiliary winding 9 which serves to generate an alternating current is disposed on the armature 1 or it may be separated from the latter and is, then, formed by the winding of a small magneto mounted on the same shaft as the armature 1. One end of the auxiliary winding 9 is connected with a collector 10 cooperating with a brush 12, while the other end of the winding 9 is connected to a conducting segment 11 forming part of a disk 11a and cooperating with a brush 13. The collector 10 and the disk 11a are both keyed to the motor shaft. The shape and the position of the segment 11 are so chosen that the brush 13 receives a little less than one half of a positive wave and a little less than half of a negative wave, as shown in Fig. 2, which represents a sinusoidal wave, the part of said wave between the lines p and q being that received by the brush 13.

A tuning fork 14 serves to regulate the speed of the motor. The fork may be vibrated in any suitable manner, such as for instance by means of a coil 15 arranged in series with a contact 16 and a battery 17. The tuning fork 14 cooperates with a contact spring 18 which is so mounted that, in the rest position of the tuning fork, it makes contact with one arm 14a of the fork and also with a fixed contact abutment 19. When the tuning fork 14 vibrates, the arm 14a thereof recedes from the spring 18 during its movement towards the right from its neutral position, while, during its swing toward the left leg and its neutral position, it lifts the spring 18 off the fixed contact 19. Thus, a very short connection between the tuning fork 14 and the contact 19 is established on each passage of the arm 14a through its neutral position, and, for a brief moment, the brush 13 is connected to the grid of the tube 8 through the back contact of the relay 4 and the resistance 20. A condenser 21 shunted by a very high resistance 22 is inserted between the grid and the cathode of the tube 8.

The device operates as follows:

When the tuning fork vibrates at a frequency equal to the number of revolutions per second to be made by the motor, a current is applied to the motor which starts it and increases its speed. As long as the centrifugally controlled contact 5 is not closed, the winding of the relay 4 is connected in the circuit of the field winding 2, and this relay holds its own back contact open. The motor is excited on the one hand by the current passing through the winding 2, which current is reduced by the resistance of the relay 4, and, on the other hand, by the current passing through the winding 3, which current has its maximum value when the grid potential of the tube 8 is equal to that of the cathode. Under these conditions, the motor tends to rotate at a speed exceeding the predetermined desired speed.

The contact 5 is closed when the motor speed is a little less than that desired and, then, the relay 4 is short-circuited. The excitation of the motor is increased and, from that moment on, the motor speed will not tend to grow any further and may even slightly decrease, but the contact 5 will remain closed under the influence of the centrifugal force.

As soon as the contact 5 is closed, the relay 4 releases and closes its back contact. From then on, during each oscillation of the tuning fork, the condenser 21 is twice connected to the brush 13, once while the brush slides over the insulating peripheral portion of the disk 11a and once while said brush cooperates with the conducting segment 11.

When this first happens, the speed of the motor in revolutions per second is slightly inferior to the frequency of the tuning fork. Consequently, the two contacts of the tuning fork are produced at two points of the sine curve shown in Fig. 2 at a distance of less than 180° from each other. Assuming for instance that the contact 5 is adapted to close when the motor speed is not more than 5% less than the predetermined desired speed, the segment 11 will be made to extend over one-half of the disk circumference minus 10%. Consequently, the contacts between 14 and 19 which occur during each oscillation of the tuning fork, can never be both produced during one passage of the brush 13 over the segment 11, but they may both take place during one passage of said brush over the insulating part of the disk 11a.

Immediately after the closing of the back-contact of relay 4, both contacts are made during the passage of the brush 13 over the insulating part of the disk 11a, for instance at the points a and a' of the sine curve, and nothing happens in the circuits. However, during the subsequent motor revolutions, since the motor speed continues to be inferior to the frequency of the tuning fork, the points a and a' are shifted gradually along the sine curve and, eventually, one contact corresponding to a, will occur at the point b, i. e. during the passage of the brush 13 over the segment 11, while the other contact, corresponding to a', will continue to occur in the inactive part of the sine curve at b'.

The point b, in turn, is further shifted in the direction of the arrow in Fig. 2, as long as the motor does not rotate at the desired predetermined speed. While the contact (b) occurs in the active part of the sine curve, the condenser 21 is charged with a negative electromotive force from the auxiliary winding 9, and the plate current of the tube 8 decreases. This causes a reduction in the field strength of the motor and a corresponding increase of the motor speed. As long as the motor speed remains inferior to the frequency of the tuning fork, the point b is shifted along the sine curve in the direction of the arrow and the field strength continues to decrease. At a certain moment, however, the tuning fork contact occurs at a point c of the sine curve where the negative potential of the grid becomes so great, that the field current causes the motor to rotate at the desired speed. If the motor speed, thereafter, tends to increase further, the grid potential rises and the field strength increases thus retarding the motor. On the other hand, a subsequent reduction of the motor speed causes a drop in the grid potential and the resulting reduction in the field strength effects an acceleration of the motor.

Fig. 3 shows a modification of the device according to Fig. 1, in which the auxiliary armature winding 9 is dispensed with. Those parts of the modified arrangement which are identical with the corresponding parts of Fig. 1 are not shown. The sine curve along which the contact points are shifted is replaced, as shown in Fig. 4, by the charge and discharge curve of a condenser.

In the embodiment according to Fig. 1, a collector 10 and a conducting segment 11 are mounted on the motor shaft but in Fig. 3 the segment 11 cooperates with two oppositely disposed brushes 13 and 23. A condenser 24 shunted by a high resistance 25 is charged, during each revolution of the motor shaft, through the brush 23 and a resistance 27 from a battery 26. The condenser charge and discharge curve is shown in Fig. 4. A battery 28, the electromotive force of which is equal to the ordinate y in Fig. 4, is connected to the condenser 24 in such a manner that the potential of the brush 13 varies from zero to a negative value just as in the case of the sine curve. The points a, b and c of Fig. 2 are indicated on this condenser potential curve and the operation of the device is the same as that of the arrangement according to Fig. 1.

The arrangement described so far can be used only for the control of direct current motors. Another modification shown in Fig. 5 is applicable to a universal series motor. In this type of motor the speed varies mainly in accordance with the load on the motor.

The series motor is represented by its field winding 29 and its armature 30. The collector 10 and the segment disk 11a are mounted on the motor shaft in the manner shown in Fig. 3. The condenser 24, the resistances 25 and 27, and the battery 28 are arranged substantially as shown in Fig. 3, but the battery 26 is connected in series with the resistance 25. Fig. 6 shows the curve of the potential difference at the terminals of the condenser 24, the active part of said curve being the rising portion between the two lines p, q.

The motor is provided with an electro-magnetic brake formed by a copper disk 31 and an electro-magnet 32. The winding of the electro-magnet 32 is in series with the plate circuit of the tube 8 and the grid of the latter is negatively polarized from the battery 28 through the high resistance 33 so that a very weak current flows in the coil of the magnet 32. A condenser 34 is inserted between the grid and the cathode to give the grid circuit a high time constant.

The contact 5 closes when the motor rotates at a speed very slightly higher than the desired speed, and this contact is so constructed that, after having closed, it will not open again when the motor speed falls for a short time to the desired speed.

When the motor is started, it accelerates automatically until its speed exceeds the desired speed, as long as the brake is inactive. When the contact 5 is closed, the condenser 34 is connected for a moment through the tuning fork contact to the high capacity condenser 24, whereby the condenser 34 is charged with a potential produced by the sum of the electromotive force of the battery 23 plus the tension across the terminals of the condenser 24. The contact takes place at a point $d$ of the curve of Fig. 6. Immediately, the grid of the tube 8 becomes less negative and the magnet 32 is excited, causing the brake to act so as to retard the motor. When the speed decreases too much, the contact point will be shifted to $e$ and the excitation of the magnet 32 will be reduced. If, on the other hand, the speed reduction is insufficient, then the contact point will be shifted to $f$ and the magnetization of the electro-magnet 32 will grow thereby increasing the brake action. Finally the contact will be established at a point of the curve where the brake action causes the motor to rotate at exactly the desired speed.

The arrangements described make the speed of rotation of one motor dependent upon the vibration of a tuning fork. However, it is frequently necessary, especially in telegraph systems, to maintain two motors, which are disposed at stations remote from each other, in synchronism and in phase for an extended period of time. Tuning forks, however, are subject to slight variations of their frequencies which produce variations in the speed of the associated motors. Over a certain time these small speed differences may add up to considerable differences in the relative angular positions of the corresponding motor shafts. According to the invention, this is prevented by the provision of means whereby the tuning fork at one of the remote stations is controlled by a tuning fork at any other remote station.

It is known that the frequency of a tuning fork with electrically activated vibration varies, to a certain extent, with the intensity of the current in the activating coil. Generally, it is desirable to make the energy required for the activation as weak as possible in order to insure a constant frequency of the tuning fork, but it is possible to deviate slightly from this rule and to activate the fork by means of a relatively strong current and in such a manner that the vibration period can be appreciably varied in accordance with the strength of the activating current. In this case, means can be provided to control one tuning fork from another one.

Fig. 7 shows diagrammatically a system of this type applied, by way of example, to two cooperating facsimile telegraph devices.

In such devices, current impulses are used at the beginning of each line scanning to insure synchronism between transmitter and receiver. These current impulses start, at the receiving station, a printing device which reproduces one line at a time. In order to simplify the system and to improve its accuracy, it is desirable to dispense with the starting at the beginning of each individual line and this can be accomplished if the motors of the two devices rotate always exactly at the same speed.

If both motors are controlled by tuning forks, it is then necessary to correct the vibration of one of the tuning forks by means of the other one. For this purpose, the tuning fork at the transmitter which is activated by a normal current is set to vibrate at a slightly lower frequency than the tuning fork at the receiver when the latter is activated by the maximum current. The difference between the two frequencies is such that under the worst possible conditions with regard to the ambient temperatures at the two stations and at the greatest possible difference of potential between the two actuator batteries, the tuning fork of the receiver can always operate a little faster than that of the transmitter. Moreover the possible frequency variation of the tuning fork at the receiver due to the variation of the current in its actuator coil is such that a compensation for the maximum difference between this frequency and that of the tuning fork of the transmitter can be accomplished. It is, then, sufficient to increase automatically the intensity in the activator coil of the tuning fork at the receiver in accordance with the lag of the receiver motor relative to the transmitter motor, in order to obtain an accurate synchronism between the two motors.

Fig. 7 shows only those parts of the two telegraph devices which are important for the synchronization arrangement. Such arrangement with suitable and obvious alterations, may be applied to devices of any type. The two telegraph devices may be connected by wire or through a wireless connection, but in the drawing a wire connection is shown for the sake of simplicity.

The transmitter, in the upper part of Fig. 7, comprises a shaft 35, which carries a drum 36 having wound thereon, in the case of a telegraphic facsimile transmission, the message to be sent out. The shaft 35 is driven by the motor 37, the speed of which is controlled by a tuning fork (not shown) in the manner described above. A speed reducing gear is interposed between the motor 37 and the shaft 35, said gear comprising the toothed wheels 38, 39, 40 and 41. The wheels 39 and 40 are secured to an intermediate shaft 42 which carries a collector ring 43 cooperating with a brush 44 and a disk with a conducting segment 45 cooperating with a brush 46. The collector 43 is electrically connected with the segment 45. The shaft 35 has keyed thereto a cam 47 which acts upon a contact spring 48 to establish alternatively the contact 48—49 or the contact 48—50.

The generator of the image transmitting current is represented by OI, while an oscillator OS operating at a different frequency supplies the synchronization signals.

When the transmitter operates, after each revolution of the shaft 35, between the end of one line to be scanned and the beginning of the following line, the contact 49 is opened and the contact 50 is closed. The wire L which was connected to OI through 48, 49 is then connected through 48—50 to the brush 44, collector 43 and segment 45. On account of the slow speed of the shaft 35, the contact 48—50 will not close at an exactly predetermined moment. However, this contact is disposed in series with the segment 45 mounted on the more rapidly rotating shaft 42 and, through this segment, with the brush 46. The angular position of the segment 45 is so chosen that the contact 45, 46 is closed a little later than the contact 48, 50 is closed, so that the oscillator OS is connected to the wire L at an exactly defined moment of each revolution of the drum 36.

The receiver, shown in the lower part of Fig. 7, comprises a shaft 51 carrying a drum 52 onto which is wound the paper to receive the message. The shaft 51 is provided with a starter device 53 of any known type, such as for instance a starter device of the type used in printing telegrams. By means of this starter device 53, the shaft 51 is coupled to a shaft 54 driven from the motor 55 by means of the reducing gears 56, 57 and 58, 59. The starter device 53 is controlled by an electromagnet 60.

The speed of the motor 55 is controlled from the tuning fork 61 by any one of the arrangements described before.

The shaft 51 drives, by means of gear wheels 87 and 88, a shaft 62, the speed of which equals that of the gears 57 and 58 and corresponds to that of the transmitter shaft 42.

The shaft 62 carries secured thereto collector rings and conducting segments 63, 64, 65, 66 and 67 cooperating, respectively, with brushes 68, 69, 70, 71 and 72. The collectors 66 and 67 are electrically connected with each other over a centrifugally controlled contact 73 which is opened when the shaft 62 revolves. The shaft 51 carries also a cam 74 acting upon a contact spring 75; the functions of the cam 74 and spring 75 correspond to those of cam 47 and contact spring 48 at the transmitter.

The frequency of the tuning fork 61 is a little inferior to that of the tuning fork at the transmitter, when the actuator coil 76 of the tuning fork 61 is traversed by the minimum current. However, the actuating current is controlled by a tetrode tube 77 as explained hereafter.

The image carrying current arrives at the amplifier RI which controls the reproduction on the drum 52. The synchronization current is received in a highly selective oscillating circuit RS. A highly selective resonant circuit contained in RS has a large time constant and the form of the current selected is represented by the curve A in Fig. 8. After amplification, detection and filtering the potential difference derived from RS has the form shown by the curve B in Fig. 8. A constant electromotive force equal to the ordinate Z and as produced in a manner explained later on, is cut off so that a potential difference of minus Z is required to reach zero. This potential difference is applied to the contact 75. The circuit RS further comprises a relay which closes the circuit of the magnet 60 upon reception of a synchronization signal.

The control circuit for the tuning fork 61 contains the resistances 78, 79, 80 and 81 and the condensers 82, 83 and 84 connected as shown in the drawing.

The actuator coil 76 of the tuning fork 61 is inserted in the plate circuit of the tetrode 77. The contact 85 connects the screen grid of the tetrode 77 through the resistance 81 to a source of positive current in such a manner that the tetrode passes current when the contact 85 is closed. When this contact is open, the screen grid, which is connected to the cathode or to a slightly negative potential through the high resistance 80, prevents the flow of current through the tetrode. A condenser 84 retards the start as well as the cessation of the current flow so as to render the operating conditions of the actuator coil 76 more favorable. It is also possible to employ a pentode in which the plate current is nullified by a negative polarization of the suppressor grid so that an appreciable loss of current through the contact 85 is avoided.

The intensity of the actuator current depends from the potential of the tetrode grid. Consequently, by varying this potential, the frequency of the tuning fork can be modified. When the motor and the tuning fork at the receiver are started, they operate at minimum speed because the tetrode grid is negatively polarized at a value chosen to activate the tuning fork with the minimum current. This polarization is obtained by means of the battery 86 connected to the grid through the brush 72, collector 67, contact 73, collector 66, brush 71 and resistance 79. The condenser 83 is inserted between the grid and the cathode to maintain said negative polarization for a moment after the opening of the contact 73.

The value of the electromotive force Z mentioned above is equal to that of the battery 86 and is so great that the vibration maintaining current in the coil 76 is minimum. When the transmitter starts a transmission, the first synchronization signal operates the magnet 60 and the starting device 53 couples the shaft 51 to the shaft 54. The circuit is so arranged that the magnet 60 operates at a moment corresponding approximately to the point $g$ of the curve B.

As soon as the shaft 62 rotates, the contact 73 is broken, but the tetrode grid maintains the same potential and the frequency of the tuning fork is not altered. Consequently, when the shaft 35 completes its first revolution and another synchronization signal is transmitted, the shaft 51 lags very slightly behind the shaft 35 so that the magnet 60 has already operated when the control finger of the starting device 53 reaches its position opposite the armature of the magnet 60. As a result, after the first start, the shaft 51 continues its rotation without interruption, but its lag relative to the shaft 35 tends to increase with each revolution. However, according to the invention, a control mechanism for the tuning fork 61 is provided which serves to make the frequency of the tuning fork 61 dependent upon that of the shaft 35 and to limit the lag between the two shafts to a constant value.

The angular position of the segment 63 on the shaft 62 is so chosen that at the first operation of the magnet 60, the contact break between the segment 63 and the brush 68 occurs approximately at the point $h$ of the curve B. The condenser 82 is, thus, charged with a potential equal to minus Z or with a potential close to minus Z, and when, a moment thereafter, the condenser 82 is connected to the condenser 83 through the brush 69, collector 64, conducting segment 65 and brush 70, the grid potential of the tetrode 77 remains the same or rises slightly so that the frequency of the tuning fork is not altered or at the most, is only slightly increased.

During the next revolution, since the motor 55 continues to rotate more slowly than the motor 37, the point $h$ is shifted to $i$, and the condenser 82 is charged with a less negative potential which is subsequently transmitted to the condenser 83 and to the grid. The plate current is increased and the frequency of the tuning fork grows.

The same operation is repeated during the following revolutions and the point $i$ is shifted successively to $j$, $k$, etc., until the grid potential brings the plate current to a value at which the increase in the frequency of the tuning fork establishes an accurate synchronism of the two motors 37 and 55. From this moment on, the point of the contact break between 63 and 68 does no longer change and the phase difference between the two shafts 35 and 62 remains constant.

In view of the small initial difference between the frequencies of the tuning forks at the two cooperating stations, it may, in practice, be difficult to have the magnet 60, after the first starting, always operate before the control finger of the starting device 53 abuts against the magnet armature. Therefore, it is advantageous to increase the sensitivity of the magnet control relay in the circuit RS when the shaft 62 has started to rotate. This can be easily accomplished, for instance by means of a centrifugally controlled contact which, in its rest position, short circuits a part of the relay winding and which opens said short circuit as soon as the shaft 62 rotates.

In the case of wireless transmission, it is further necessary to correct the effect of fading on the frequency control circuit in order to avoid deformation of the curve B and consequent variations in the phase of the receiver shaft. For this purpose, a corrective device of any known type may be provided in the input of the resonant circuit of RS, such as for instance a tube operating with saturation for very weak currents so that the impulses delivered to the oscillating circuit are always the same.

The above described system can be varied in numerous ways. For instance, a great number of transitory phenomena such as the charges or discharges of condensers, of self-inductance coils, etc., may be used to generate potential differences which vary in accordance with the desired curves and on which a contact point is selected which is shifted along the curve in accordance with the difference in frequency or speed of the controlled mechanisms.

Within the spirit of the present invention the control potential can be used in numerous ways of which only some examples were given in the preceding description.

I claim:

1. An arrangement for controlling the frequency of one cyclically moving system from that of another cyclically moving system, comprising a device operating in dependence upon the frequency of one of said systems to generate during each cycle thereof a continuously varying potential having a predetermined continuous curve, a tube containing a cathode, a plate and a grid, means operating in dependence upon the frequency of the second system to connect said potential creating device intermittently with said grid so as to apply to the latter a potential corresponding to a point on said curve shifted along the curve in a steady function of the phase difference between the two systems thereby varying the grid potential of said tube and its plate current in dependence upon said phase difference, and means controlled by said plate current to vary the frequency of one of said systems in dependence upon the varying strength of said plate current.

2. An arrangement for controlling the speed of rotation of a rotary system comprising a tuning fork having a natural frequency corresponding to the desired rotary frequency of said system, an activator for said tuning fork, a device operating in dependence upon the rotation of said system to generate, during each revolution of the latter, a continuously varying potential having a predetermined curve, a tube containing a cathode, a plate and a grid, means including a contact controlled by said tuning fork to connect said potential creating device intermittently with said grid so as to apply to the latter during each revolution of the rotary system during which the phase difference between the rotary system and the tuning fork exceeds a predetermined value, a potential corresponding to a point on said curve shifted along the latter in function of the value of said phase difference, and means controlled by the plate current of said tube to vary the speed of said rotary system until synchronism between the rotary system and the tuning fork has been achieved and the phase difference and grid potential have become constant.

3. An arrangement, as claimed in claim 2, in which said potential generating device comprises an alternator driven by said rotary system.

4. An arrangement, as claimed in claim 2, in which said potential generating device comprises a condenser, a source of current, and means driven by said rotary system to connect said condenser intermittently to said source of current.

5. An arrangement, as claimed in claim 2, in which said means connecting said potential generating device with said grid includes a contact sector driven by said rotary system, and a brush cooperating with said contact sector to receive slightly less than one-half of the potential wave created during each revolution of the rotary system, said contact controlled by said tuning fork closing twice during each cycle of the latter and only one of said two closures operating to transmit a potential to said grid.

6. An arrangement, as claimed in claim 2, in which said rotary system is a direct current motor with shunt field winding, and said speed varying means includes an additional field winding connected in series with the plate of said tube.

7. An arrangement, as claimed in claim 2, in which said rotary system is a universal serial motor, and said speed varying means includes an electro-magnetic brake acting on the shaft of said motor and having a coil connected in series in said plate circuit.

8. An arrangement to control the frequency of a tuning fork in dependence upon a synchronization signal received from a remote transmitter station operating at a predetermined frequency, said arrangement comprising means to convert the received synchronization signal into a continuously varying potential, the curve of which is a function of the transmitter frequency, a tube containing a cathode, a plate and a grid, an activator for the tuning fork having a coil connected in series in the plate circuit of said tube, and means including at least one intermittently operating make and break contact controlled by said tuning fork to connect said signal converting means intermittently with said grid so as to apply to the latter, upon each operation of said contact, a potential corresponding to a point on said curve shifted along the latter in function of the phase difference between the transmitter and the tuning fork, until the frequencies of the transmitter and the tuning fork have become equal and said phase difference, the grid potential and the strength of the plate current through the activator coil have become constant.

LUCIEN DEVAUX.

REFERENCES CITED

The following references are of record in the file of this patent:

UNITED STATES PATENTS

| Number | Name | Date |
| --- | --- | --- |
| 2,322,985 | Wegener | June 29, 1943 |